(12) United States Patent
Allen (10) Patent No.: US 7,431,243 B1
(45) Date of Patent: Oct. 7, 2008

(54) GUIDANCE AND CONTROL FOR AN AUTONOMOUS SOARING UAV

(75) Inventor: Michael J. Allen, Tehachapi, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 371 days.

(21) Appl. No.: 11/277,325

(22) Filed: Mar. 23, 2006

(51) Int. Cl.
*G05D 1/00* (2006.01)
*B64C 31/02* (2006.01)
*B64C 13/00* (2006.01)
*B64C 19/00* (2006.01)
*G01C 23/00* (2006.01)

(52) U.S. Cl. .................. 244/195; 244/16; 244/75.1; 244/175; 701/3

(58) Field of Classification Search ........... 244/194, 244/195, 75.1, 179, 1 R, 180, 190, 181, 16, 244/76 R, 158.1, 171.8; 701/3, 7, 5; 73/170.02, 73/170.28, 112.01, 112.03, 112.04, 118.03
See application file for complete search history.

(56) References Cited

U.S. PATENT DOCUMENTS

| | | | | |
|---|---|---|---|---|
| 4,506,847 A | * | 3/1985 | Norman | 244/1 R |
| 4,591,111 A | * | 5/1986 | Laughter | 244/1 R |
| 6,012,675 A | | 1/2000 | Cocatre-Zilgien | |
| 6,089,506 A | * | 7/2000 | Scheffel | 244/76 R |
| 2004/0129071 A1 | | 7/2004 | Plaszowiecki | |
| 2007/0252035 A1 | * | 11/2007 | Hubbard, Jr. | 244/75.1 |

OTHER PUBLICATIONS

Cone, Clarence D. The Design of Sailplanes For Optimum Thermal Soaring Performance. Jan. 1964. National Aeronautics and Space Administration. NASA TN D-2052. All Pages.*
Wharington, et al. "Control of a High Endurance Unmanned Air Vehicle." AIAA-A98-31555, Sep. 13-18, 1998.*
Reichmann, Helmut. Cross Country Soaring, Soaring Society of America, Hobbs, NM, ISBN I-883813-01-8, 1993, pp. 9-11.*
Cone, Clarence D Jr. The Design of Sailplanes for Optimum Thermal Soaring Performance. Jan. 1964. National Aeronautics and Space Administration, Langley Research Center, Hampton, VA. NASA TN D-2052.*
Michael J. Allen, "Autonomous Soaring for Improved Endurance of a Small Uninhabited Air Vehicle", AIAA-2005-1025, 2005.
Weimerskirch, H, et al., "Frigatebirds Ride High on Thermals," Nature, vol. 21, Jan. 23, 2003, pp. 333-334.

* cited by examiner

*Primary Examiner*—John Q. Nguyen
*Assistant Examiner*—Stephen Brookman
(74) *Attorney, Agent, or Firm*—Mark Homer (57) ABSTRACT

The present invention provides a practical method for UAVs to take advantage of thermals in a manner similar to piloted aircrafts and soaring birds. In general, the invention is a method for a UAV to autonomously locate a thermal and be guided to the thermal to greatly improve range and endurance of the aircraft.

10 Claims, 4 Drawing Sheets

Top level block diagram of the present invention.

Figure 1. Top level block diagram of the present invention.

Figure 2. Block diagram of the total energy estimation (block 10).

Figure 3. Block diagram of the thermal identification (block 20).

Figure 4. Comparison of the queue, $q_s$, before the drift correction to the queue, $q_c$, after the drift correction. Drift was calculated using $P_{up1}$ and $P_{up2}$.

Figure 5. Predicted updraft velocity distribution from equation 17 for $w_{up}$ =2m/s and $r_{up}$=45m.

Figure 6. Influence vector, $H$, for a queue size, $N_q$, of 45. The influence vector is used to de-emphasize older data points.

Figure 7. Block diagram of soaring controller (block 40).

Figure 8. Block diagram of mode logic (block 50).

GUIDANCE AND CONTROL FOR AN AUTONOMOUS SOARING UAV

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally autonomous soaring for uninhabited air vehicles (UAVs), particularly to improved endurance for autonomous soaring UAVs, and more particularly to using thermals or convective thermals to improve the performance of UAVs.

2. Description of the Related Art

Glider pilots have been using buoyant plumes of air found in the lower atmosphere, normally referred to as thermals, in order to extend the distance that a glider may travel for many years.

Several systems have been developed to assist pilots of gliders or low-powered aircraft to locate such thermals in order to provide improved range, endurance, or cross-country speed. For example, U.S. Pat. No. 6,012,675 describes a system that monitors air humidity to locate "moist" thermals and U.S. patent application 2004/0129071 describes a system that employs a database of places on the ground that are likely to generate thermals in conjunction with current weather projections to attempt to estimate positions of thermals for pilots.

Over the past several years, it has also been suggested that UAVs could benefit from using thermals in the same manner as piloted aircraft to improve range, endurance, and speed. For instance, Wharington, et al. in "Control of High Endurance Unmanned Air Vehicle" proposes the concept of using thermals to improve the performance of UAVs and discloses a general control scheme that could be applied for the UAV to take advantage of thermals. However, the paper states that a superior control scheme would be necessary for practical application of the concept. Further, Michael J. Allen, the inventor of the present invention, in "Autonomous Soaring for Improved Endurance of a Small Uninhabited Air Vehicle" provides mathematical evidence that UAVs may dramatically improve range and endurance when employing thermals.

However, until the present invention, no known practical control and guidance system has been developed for UAVs to take advantage of the benefits of thermals. Therefore, it is desired to provide a guidance and control system and method for UAVs to locate and use thermals to provide improved range and endurance.

SUMMARY OF THE INVENTION

The invention proposed herein comprises a system and method of guidance and control for autonomous UAVs that allow the UAVs to locate and use thermals in order to increase the range and endurance of the UAVs.

Accordingly, it is an object of this invention to provide a system and method for an autonomous UAV to independently locate thermals in the lower atmosphere.

It is a further object of this invention to provide a system and method for guiding an autonomous UAV to the "center" or "strongest" portion of a located thermal in the lower atmosphere.

This invention meets these and other objectives related to improving guidance and control for an autonomous soaring UAV by providing a method for locating and using thermals to improve endurance of UAVs. The method includes the step of estimating energy rate and energy acceleration from total energy of the air vehicle. This is done by using values for static pressure around the UAV, true air speed of the UAV, and command to the motor. The method also includes the step of identifying the radius, strength and position of a thermal. This is accomplished using the energy rate and location of the UAV. The UAV position error, velocity error, and steady-state turn rate are then obtained using the location of the UAV, and the thermal radius, strength, and position. The method also includes identifying the soaring turn rate command for the UAV using the UAV position error, velocity error, steady-state turn rate, and energy acceleration. Also, a final turn rate or bank angle is identified for the UAV through mode switching using the soaring turn rate, and a waypoint tracking turn rate. Finally, the UAV is controlled to guide it to locate and stay within the thermal.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

The following nomenclature will be employed herein to describe the present invention:

a equatorial radius of the earth, m
D estimated thermal drift velocity, m/s
$err_p$ position error, m
$err_{sumsq}$ sum squared error, $m^2/s^2$
$\hat{err}_{sumsq}$ sum squared error for perturbed thermal radius, $m^2/s^2$
$err_v$ velocity error, m/s
$err_w$ weighted error, m/s
$\hat{err}_w$ weighted error for perturbed thermal radius, m/s
$\dot{E}$ energy rate, N·m
$\dot{E}_{motor}$ total energy rate due to the motor, N·m/s
$\ddot{E}$ energy acceleration, $m/s^2$
$\ddot{E}_n$ normalized energy acceleration, $m/s^2$
g gravitational constant, $m/s^2$
H influence vector
$h_{est}$ estimated aircraft altitude, m
i queue index
k current measurement index
$k_1$ energy acceleration gain, unitless $k_2$ position error gain, unitless
$k_3$ velocity error gain, unitless
L learning rate, $1/s^2$
Lat latitude of aircraft, rad
$Lat_0$ latitude of X Y reference frame, rad
Lon longitude of aircraft, rad
$Lon_0$ longitude of X Y reference frame, rad
M aircraft mass, kg
$N_q$ number of rows in the queue.
$P_{static}$ static pressure, Pa
$P_{up}$ estimated thermal position, m
$P_{upD_1}$ thermal position calculated from the first 20 entries in the queue, m
$P_{upD_2}$ thermal position calculated from the last 20 entries in the queue, m
$P_X$ aircraft X position, m
$P_Y$ aircraft Y position, m
$q_1$ queue of aircraft position and energy rate
$q_s$ queue of aircraft position and shifted energy rate
$q_2$ queue of drift corrected aircraft position and energy rate
$r_{up}$ estimated thermal radius, m
$\hat{r}_{up}$ perturbed thermal radius, m
s laplace transform variable
S distance between the aircraft and the thermal center, m
soarMode mode logic logical
T thrust from the motor, N
$T_{max}$ maximum thrust from the motor, N
$throt_{t-1}$ one-second delayed throttle command, fraction
$throt_{trim}$ trim throttle needed for level flight, fraction
V airspeed, m/s
$\dot{V}_{motor}$ aircraft velocity rate due to the motor, m/s$^2$
$w_{up}$ estimated thermal velocity, m/s
$w_{pred}$ predicted thermal velocity, m/s
$\hat{w}_{pred}$ predicted thermal velocity for perturbed thermal radius, m/s
$\delta_r$ stepsize, m
$\Delta_r$ error gradient for perturbed thermal radius, m/s$^2$
$\dot{\psi}_{cmd}$ turn rate command, deg/s
$\dot{\psi}_{ss}$ steady state turn rate, deg/s One relatively unexplored way to improve the range, duration, or cross-country speed of an autonomous aircraft is to use buoyant plumes of air found in the lower atmosphere called thermals or convective thermals. Thermals occur when the air near the ground becomes less dense than the surrounding air because of heating or humidity changes at the Earth's surface. Piloted sailplanes rely solely on this free energy to stay aloft for hours at a time and to make cross-country flights. Soaring birds, such as hawks and vultures, have been observed to circle for hours without flapping their wings, and Frigatebirds are known to soar continuously day and night using thermals.

Many UAVs have similar sizes, wing loadings, and mission profiles to soaring birds and sailplanes. Mission profiles that could allow small UAVs to take advantage of thermals include remote sensing, surveillance, atmospheric research, communications, force protection, and Earth science. A study using a simple UAV simulation with thermals calculated from measured surface and balloon data found that a 2-hour nominal-endurance UAV can gain up to 12-hours of flight time using thermals.

The present invention provides a practical method for UAVs to take advantage of thermals in a manner similar to piloted aircrafts and soaring birds. In general, the invention comprises a method for a UAV to locate a thermal and autonomously be guided to the thermal to greatly improve the range and endurance of the aircraft.

Figure 1:
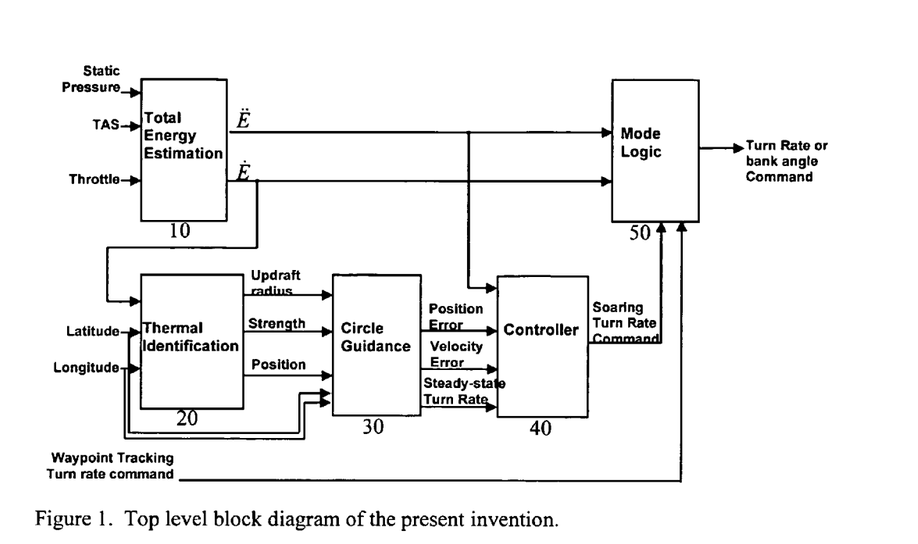
FIG. 1 depicts a top level block diagram of the present invention.

The top-level autonomous soaring guidance and control method is shown in FIG. 1. Static and total pressure sensor input (to obtain true air speed) along with the aircraft throttle command were used to determine the rate (first derivative) and acceleration (second derivative) of aircraft total energy in the total energy estimation block 10. These energy rate and energy acceleration values are used as inputs to the mode switching block 50 as described further below.

The energy rate from the total energy estimation block 10 along with the position of the aircraft (latitude and longitude) are then used to identify a thermal that has been encountered by the aircraft 20. The thermal radius, strength, and position are calculated in block 20, using these input values.

In the circle guidance block 30, the thermal radius, strength, and position from block 20 are used to obtain values for aircraft position error and aircraft velocity error in relation to the identified thermal position. The UAV steady-state turn rate is also obtained in this step.

The aircraft position error, aircraft velocity error, aircraft steady-state turn rate acquired in guidance block 30, and the energy acceleration obtained from the total energy estimation block 10 are used to provide a soaring turn rate command in the controller block 40. The soaring turn rate command is the turn rate that is given to the UAV by the controller to lead the aircraft within the thermal to maximize climb rate while the UAV is in soaring mode.

Finally, the energy rate, energy acceleration, waypoint tracking turn command, and soaring turn rate command are input into the mode switching block 50. In the mode switching block 50, mode logic is used to determine when the UAV should be told to switch between searching flight (looking for a thermal) and soaring flight (using a thermal). Energy rate and energy acceleration are used to determine when the aircraft should be in searching mode and follow the waypoint tracking turn command or if the aircraft should be in soaring mode and follow the soaring rate turn command. In this block, when the amount of energy obtained from a thermal decreases to a certain level, the UAV is commanded to switch from soaring flight to searching flight.

Figure 2:
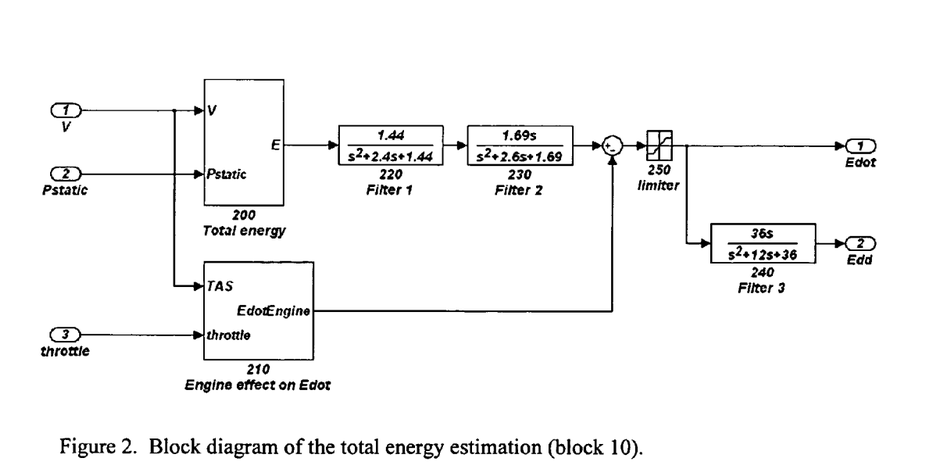
FIG. 2 depicts a block diagram of the total energy estimation shown in FIG. 1.

FIG. 2 depicts a more detailed explanation of the total energy estimation block 10 of FIG. 1. Aircraft total energy (non-engine energy) 200 is first calculated from airspeed, V, and static pressure, $P_{static}$, using equations 1 and 2.

$$E = \frac{1}{2}gV^2 + h_{est} \quad (1)$$

Equation 1 is solved using gravity, g, and the estimated aircraft altitude, $h_{est}$, from equation 2.

$$h_{est} = \left[1 - \left(\frac{p_{static}}{101325}\right)^{0.1903}\right]44333.7 \quad (2)$$

The total energy calculations are shown in blocks 220 and 230. Total energy is filtered with filter 1 before it is differentiated with filter 2. Filter 1 is a $2^{nd}$ order filter with a bandwidth of 1.2 rad/s that is used to remove noise and measurement resolution errors from the estimated total energy before the signal is differentiated. Filter 2 is the combination of a $2^{nd}$ order filter and a differentiator. Filter 2 both filters and calculates the rate of change of the input signal.

Energy rate, $\dot{E}$, is corrected to account for the energy added to the aircraft by the motor 210. The correction term was found by differentiating equation [1] and solving for motor terms only. The resulting relationship is given in equation [3].

$$\dot{E}_{motor} = \frac{V\dot{V}_{motor}}{g} \quad (3)$$

Equation 3 is solved using an approximation of $\dot{V}_{motor}$ given in equation [4]

$$V_{motor} = \frac{T}{M} \quad (4)$$

where T is the axial force from the motor and M is the aircraft mass. Thrust is calculated from the simple engine model given in equation [5]

$$T = \frac{0.64(throt_{t-1} - throt_{trim})T_{max}}{s^2 + 0.16s + 0.64} \quad (5)$$

where $throt_{t-1}$ is the 1-second delayed throttle command and $throt_{trim}$ is the trim throttle needed for level flight. The term $T_{max}$ is the maximum thrust generated by the motor. Equation [5] is essentially a gain on the throttle command delta from trim with a one-second time delay and a $2^{nd}$ order filter with a 0.8 rad/s cutoff frequency. Values for $T_{max}$ and $throt_{trim}$ were initially taken from ground measurements but were later updated using flight data.

Preferably, a limiter 250 is employed in order to ensure that the data calculated falls within certain boundaries, to assure that the data makes "real world" sense.

Filter 3, 240, is used to calculate energy acceleration, $\ddot{E}$. Energy acceleration is normalized to produce normalized energy acceleration, $\ddot{E}_n$, using equation 6.

$$\ddot{E}_n = \frac{\ddot{E}}{\max(\dot{E}, 1.0)} \quad (6)$$

Normalized energy acceleration is used for soaring control because normalization reduces the sensitivity of the controller to variations in thermal strength.

The three filters used in the total energy calculations remove noise from the aircraft energy acceleration estimate but with a cost of approximately 2.5 seconds of time delay. This delay reduced the effectiveness of the $\ddot{E}$ feedback channel in the controller and is the primary reason for the development of a thermal state estimator described in blocks 20 and 30 of FIG. 1.

Figure 3:
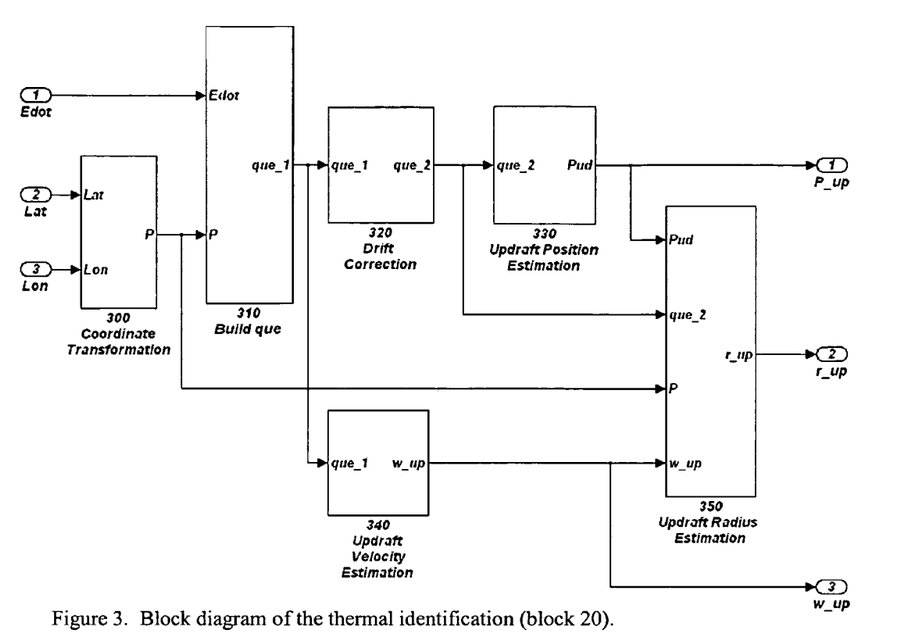
FIG. 3 depicts a block diagram of the thermal identification shown in FIG. 1.

FIG. 3 depicts a more detailed explanation of the thermal identification block 20 of FIG. 1.

An estimation of the thermal location, size, and strength is made in order to provide the controller with a faster indication of the aircraft state with respect to the thermal. The aircraft position, P, is calculated in block 300 from the latitude and longitude using equations 7 and 8.

$$P_X = (Lat - Lat_0)a \quad (7)$$

$$P_Y = (Lon - Lon_0)a \cos(Lat_0) \quad (8)$$

Equations 7 and 8 are solved using the equatorial radius of the Earth, a, the aircraft latitude and longitude, Lat and Lon, and the latitude and longitude of the chosen origin location, $Lat_0$ and $Lon_0$. The origin location can be chosen to be the location of the UAV ground station.

A history of previous aircraft positions and energy rates was collected in a first in first out queue, block 310, given by equation 9.

$$q_1 = \begin{bmatrix} P_{X_k} & P_{Y_k} & \dot{E}_k \\ P_{X_{k-1}} & P_{Y_{k-1}} & \dot{E}_{k-1} \\ \vdots & \vdots & \vdots \\ P_{X_{k-Lq+1}} & P_{X_{k-Lq+1}} & \dot{E}_{k-Lq+1} \end{bmatrix} \quad (9)$$

Entries to the queue given in equation 9 are made once per second, where k is the current measurement index. The length of the queue, $L_q$, used in equation 9 was chosen to be 45.

Estimation of the movement or drift of the thermal, block 320, is important for achieving a good estimate of thermal position and radius. Drift is primarily caused by wind but early flight tests showed that thermals do not always drift with the same velocity or direction as the prevailing winds. Thermal drift is calculated by comparing the position of the thermal given by the first 20 entries of the queue with the position of the thermal given by the last 20 entries of the queue. To begin, the energy rate entries of the queue are shifted using equation 10 to prevent zero or negative values.

$$q_s = q_1 \begin{bmatrix} 1 & 0 & 0 \\ 0 & 1 & 0 \\ 0 & 0 & 1 - \min(q_1(:,3)) + 0.01 \end{bmatrix} \quad (10)$$

Equation 10 produces the shifted queue, $q_s$, where the term $q_1(:,3)$ represents the $3^{rd}$ column of $q_1$.

The thermal position given by the first or newest 20 rows of $q_s$, is calculated using equation 11.

$$P_{upD_1} = \frac{\sum_{i=1}^{20} q_s(i, 1:2) \cdot q_s(i, 3)}{\sum_{i=1}^{20} q_s(i, 3)} \quad (11)$$

The thermal position given by the last 20 rows of $q_s$ is calculated using equation 12.

$$P_{upD_2} = \frac{\sum_{i=N_q-19}^{N_q} q_s(i, 1:2) q_s(i, 3)}{\sum_{i=N_q-19}^{N_q} q_s(i, 3)} \quad (12)$$

The estimated drift velocity of the thermal, D, is calculated from equation 13

$$D = \frac{P_{upD2} - P_{upD1}}{N_q - 20} \quad (13)$$

The drift velocity is limited to +/−10 m/s and rate was limited to +/−0.1 m/s² to prevent measurement errors in $q_1$ from causing large changes in D. The estimated drift velocity is then used to correct $q_s$ for drift to form a corrected queue, $q_c$, using equations 14-15.

$$q_c(i,1:2)=(i-1)D+q_s(i,1:2) \quad (14)$$

$$q_c(i,3)=q_s(i,3) \quad (15)$$

Figure 4:
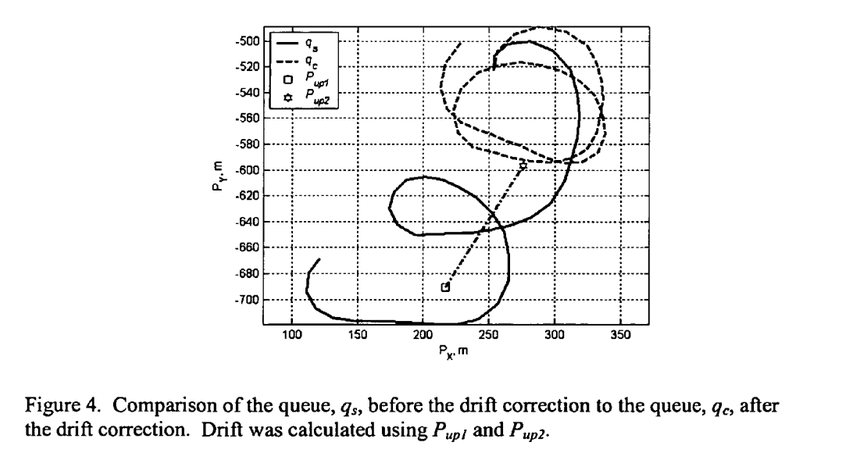
FIG. 4 depicts a graph comparing the queue before and after drift correction is applied as set forth in FIG. 3.

FIG. 4 shows the effect of the drift velocity in moving the positions in $q_s$ to the positions given in $q_c$. Typical data from soaring flight is used in this illustration. The result of the drift correction is to shift all the positions in the queue together to appear as though the thermal did not drift. The resulting queue, $q_c$, can then be used to give a better estimate of the current thermal position and radius.

Again, referring to FIG. 3, the estimated thermal position, $P_{up}$, is calculated, block 330, using the corrected queue, $q_c$, as given in equation 16.

$$P_{up} = \frac{\sum_{i=1}^{N_q} q_c(i,1:2) q_c(i,3)^2}{\sum_{i=1}^{N_q} q_c(i,3)^2} \quad (16)$$

Equation 16 differs from equations 11 and 12 in that the Ė terms of the queue are squared. This makes the resulting estimated thermal position move closer to areas of strong lift. Equation 16 represents the centroid of the aircraft energy rate during the previous $N_q$ seconds. This method for estimating thermal position is easy to implement, does not require tuning, can be used for any thermal size, and does not have a high computational cost. Drawbacks associated with this method are that it is sensitive to the length of the queue and it usually biases the estimated thermal position toward the center of the measurement set.

Thermal velocity, $w_{up}$, is approximated, block 340, from the aircraft energy rate history found in $q_c$. The equation used to estimate $w_{up}$ is given in equation 17.

$$w_{up}=1.1 \max(q_c(:,3)) \quad (17)$$

Equation 17 uses the assumption that the maximum thermal velocity is 10% greater than the maximum climb rate experienced by the vehicle during the previous $N_q$ seconds. The thermal velocity is rate limited to not increase faster than 0.025 m/s² and not to decrease faster than 0.015 m/s² as a way to retain old information about the thermal strength that has been passed from the queue. The estimated thermal strength is used in addition to $q_c$ to estimate the thermal radius.

The radius of the thermal, block 350, is estimated using a gradient descent method to fit an assumed thermal shape to the data found in the queue. The estimation process starts with the calculation of the distance between each position in $q_c$ to the estimated thermal center, $P_{up}$ using equation 18.

$$S(i)=\sqrt{(q_c(i,1)-P_{up}(1))^2+(q_c(i,2)-P_{up}(2))^2} \quad (18)$$

The vector, S, is used to calculate the predicted thermal velocity of each point in $q_c$ using the thermal velocity distribution shape given in equation 19.

$$w_{pred} = (w_{up}+0.5)e^{-\left(\frac{s}{\max(r_{up},1)}\right)^2} - 0.5 \quad (19)$$

Figure 5:
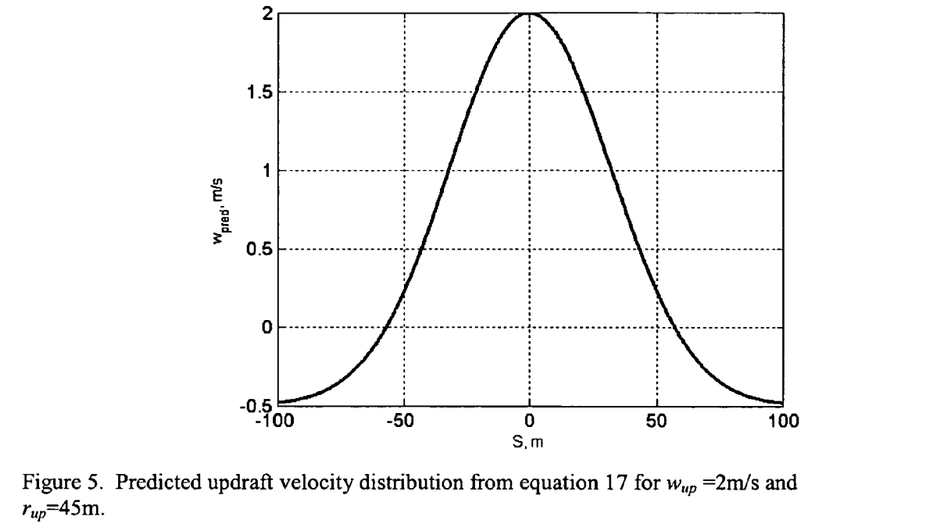
FIG. 5 depicts a graph showing predicted thermal velocity distribution from equation 17 in the specification.

Equation 19 is first solved using an initial value of 45 meters for the estimated thermal radius, $r_{up}$, and then estimated thermal radius thereafter. The shape of the thermal velocity distribution is plotted in FIG. 5.

A weighted error, $err_w$, is calculated by taking the difference between the predicted thermal velocity, $w_{pred}$, and the energy rate of the aircraft given in the $3^{rd}$ column of the queue, $q_c$. The weighted error vector is calculated using equation 20.

$$err_w(i)=(w_{pred}(i)-q_c(i,3))H(i) \quad (20)$$

Figure 6:
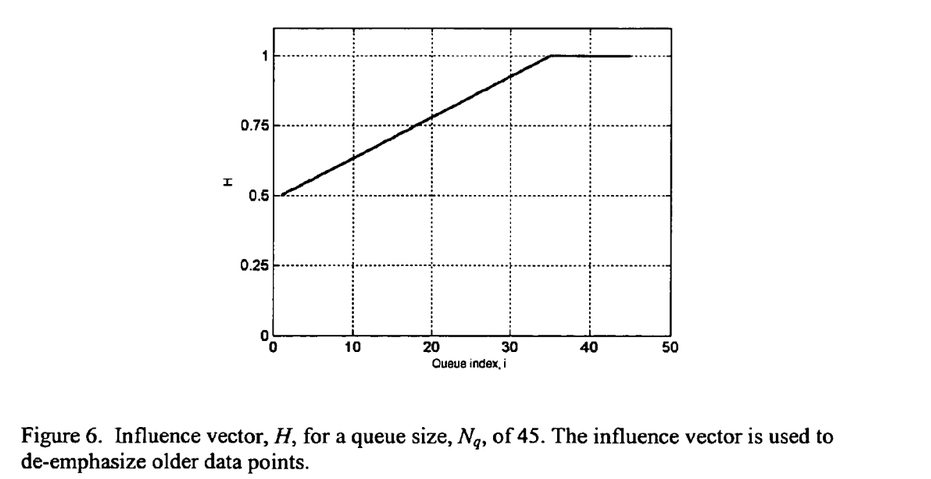
FIG. 6 depicts an influence vector used to deemphasize older data points in the queue shown in FIG. 3.

The influence vector, H, is used to weight the more recent values of $q_c$ and $w_{pred}$ higher than the older values. Values for H are plotted in FIG. 6.

The sum squared error, $err_{sumsq}$, is calculated using equation 21.

$$err_{sumsq} = \frac{err_w \cdot err_w}{N_q} \quad (21)$$

Equation 21 gives a measure of the fit between the assumed thermal shape given in equation 19 and the measured thermal velocity stored in the queue. The sum squared error for a perturbed radius, $\hat{err}_{sumsq}$, is calculated in a similar way using equations 22 through 24.

$$\hat{w}_{pred} = (w_{up}+0.5)e^{-\left(\frac{s}{\max(\hat{r}_{up},1)}\right)^2} - 0.5 \quad (22)$$

$$\hat{err}_w=(w_{pred}-q_c(:,3))H \quad (23)$$

$$\hat{err}_{sumsq} = \frac{err_w \cdot err_w}{N_q} \quad (24)$$

The perturbed radius, $\hat{r}_{up}$, used in equation 22 is defined by equation 25.

$$\hat{r}_{up}=r_{up}+\delta_r \quad (25)$$

The stepsize, $\delta$, is set to 0.5 m for this illustration.

The sum squared error for the current thermal radius and the sum squared error for the perturbed thermal radius are used to calculate a simple gradient as given in equation 26.

$$\Delta_r = \frac{err_{sumsq} - \hat{err}_{sumsq}}{\delta_r} \quad (26)$$

The gradient is then used to calculate the thermal radius for the next frame using equation 27.

$$r_{up_{k+1}}=L\Delta_r+r_{up_k} \quad (27)$$

The learning rate, L, is set to 10 for this illustration.

Circle guidance block 30 of FIG. 1 is described in more detail below. Guidance calculations are used to determine the steady state turn rate needed to fly in the estimated thermal and to produce position and velocity errors to the soaring controller. The aircraft is commanded to fly a circular flight path having a radius, $r_{cmd}$, determined by equation 28.

$$r_{cmd}=0.65 r_{up} \quad (28)$$

The scale factor 0.65 is chosen because it defines a flight path radius that is usually small enough to be within the thermal "core" but large enough to avoid the high aircraft sink rate associated with high bank angle turns. The steady state turn rate, $\dot{\psi}_{ss}$, needed to fly at an airspeed of V along a circular path given by $r_{cmd}$ is given in equation 29.

$$\dot{\psi}_{ss} = \frac{-180V}{\pi r_{cmd}} \tag{29}$$

The negative sign found in equation 29 is used to ensure that the aircraft always circles to the left while soaring. This is done for simplicity and to give the aircraft ground personnel a quick visual indication of the aircraft mode during flight tests. For this embodiment of the invention, flight plans were designed to command right turns when the aircraft is searching for thermals and left turns when the aircraft is in soaring mode. Position error, $err_p$, is generated using equation 30.

$$err_p = r_{cmd} - S(1) \tag{30}$$

Position error is differentiated and filtered to create velocity error, $err_v$ using the transfer function given in equation 31.

$$err_v = \frac{1.69s}{s^2 + 2.6s + 1.69} err_p \tag{31}$$

The guidance calculations given in equations 28-31 calculate the position error, velocity error, and turn rate command information that is used by the soaring controller to maintain a circular flight path that was centered on the thermal.

Figure 7:
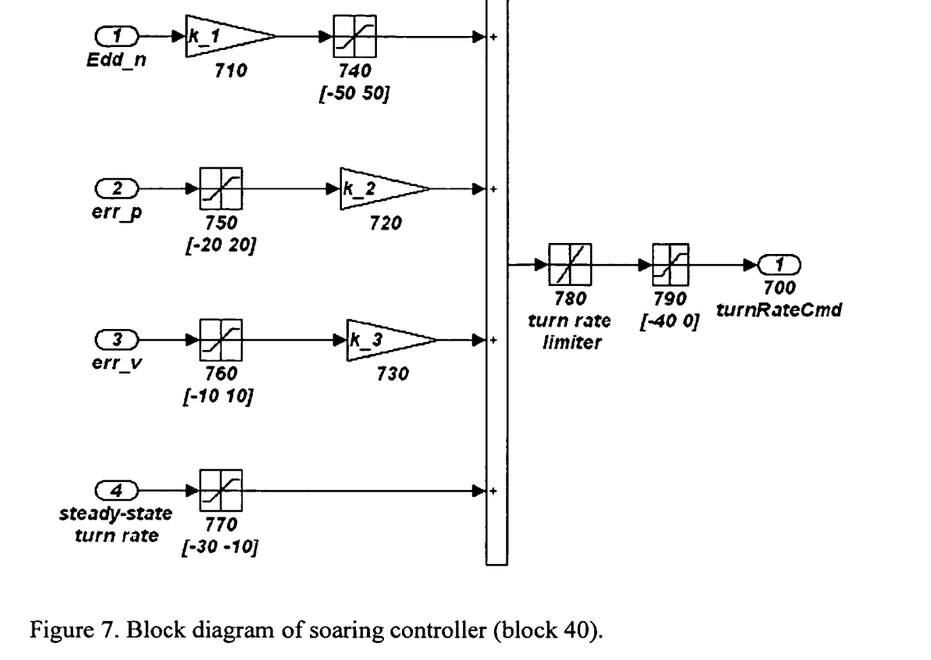
FIG. 7 depicts a block diagram showing an embodiment of the controller of the present invention.

Referring to FIG. 7, the controller block 40 from FIG. 1 is described in further detail. The soaring controller 700 architecture is loosely based on a thermal centering method given for glider pilots in "Cross Country Soaring" by Reichmann, et al., Soaring Society of America, Inc., Hobbs, N. Mex., ISBN 10883813-01-8, 1993, which is incorporated herein by reference. The method states three rules;

1. As climb improves, flatten the circle (approx. 15-20°)
2. As climb deteriorates, steepen the circle (approx. 50°)
3. If climb remains constant, keep constant bank (approx 25-30°)

These rules are used as a guideline for the soaring controller design. Energy acceleration feedback is used to implement rules 1 and 2 because the rules given by Reichmann, et al. are to be applied to the "changes in rate of climb." Rule 3 is implemented with steady-state turn rate. The soaring controller 700 inputs consist of normalized energy acceleration, $\ddot{E}_n$, position error, $err_p$, velocity error, $err_v$, and steady-state turn rate, $\dot{\psi}_{ss}$. The soaring controller 700 output consists of a turn rate command, $\dot{\psi}_{cmd}$, that is sent to the autopilot. The controller gains, $k_1$, $k_2$, and $k_3$, 710, 720, and 730 respectively, are tuned by first setting $k_2$ 720 and $k_3$ 730 equal to zero. The energy acceleration gain $k_1$ 710 is tuned to produce a simulated aircraft response that followed the rules outlined by Reichmann, et al. when subjected to a variety of thermal strengths and sizes. The thermal model given in the reference is implemented into a hardware in the loop simulation for controller 700 evaluation and gain tuning. The $k_2$ 720 and $k_3$ 730 gains are tuned to make the path of the aircraft more circular and to improve the damping of the controller 700 during soaring flight in a variety of thermal sizes and strengths. The resulting control gains were chosen to be 50, 0.4, and 0.165 for $k_1$, $k_2$, and $k_3$ respectively. Limiters 740, 750, 760, and 770 are used to limit the inputs into the controller 700 to ensure that one input does not dominate the aircraft's control. The output turn rate command is also limited by a turn rate limiter 780 to ensure the aircraft doesn't turn too abruptly and a limiter 790 to ensure the aircraft only turns left during soaring. Alternatively, the turn rate command output of the soaring controller can be used as a bank angle command if desired.

Figure 8:
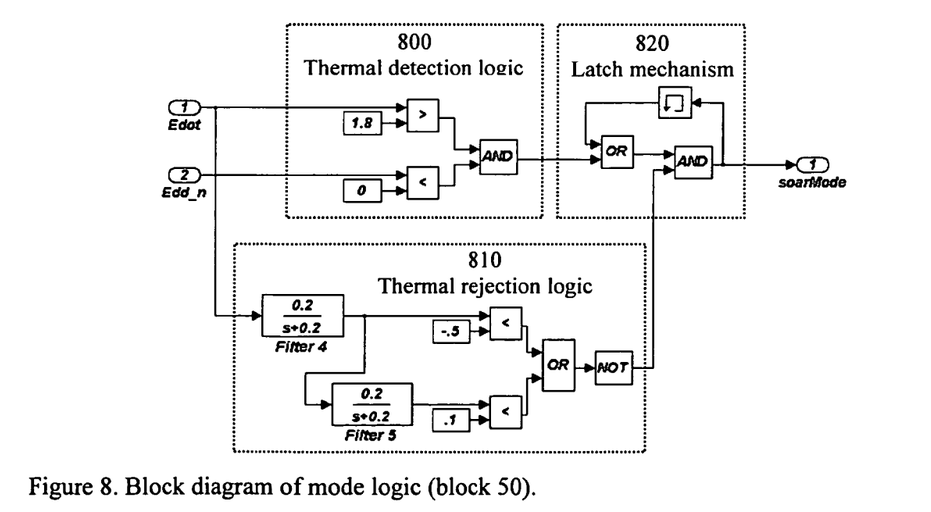
FIG. 8 depicts a block diagram showing the mode switching logic employed in the present invention.

FIG. 8 shows a mode logic diagram that depicts the mode switching block 50 from FIG. 1 in greater detail.

In general, mode logic is used to determine when to switch between searching flight and soaring flight. The mode logic described in this section is significant because it determines how a thermal is detected. The mode logic is broken into three components. Thermal detection logic 800 mode switching uses aircraft response to detect thermals upon encountering thermals. An encounter with a thermal by the aircraft produces large changes in energy rate and energy acceleration because of the atmospheric energy imputed to the aircraft as it traverses the thermal. During flight through a thermal, the energy acceleration changes sign and becomes negative when the energy rate peaks. The thermal detection logic is tuned to trigger when the thermal is imputing significant energy to the aircraft and the peak value has been reached. Thus, the thermal detection logic 800 provides a basic crest determination, above a selected threshold, for the thermal.

The thermal rejection logic 810 provides a decision to switch from soaring flight to searching flight using energy rate. Thermal rejection 810 is needed to switch from soaring flight to searching flight when the thermal is no longer providing sufficient energy to the aircraft. Two energy rate based criteria are used by the thermal rejection logic 810. First, thermals are rejected if the smoothed output of filter 4 is less than −0.5 m/s. This criteria is met if the aircraft encountered light sink for a period of approximately 5 seconds. The second criteria, based on the output of filter 5, is triggered if the aircraft has not experienced sufficient energy rate for approximately 10 seconds. Additional criteria, not shown, may be used to disengage from soaring mode. The additional criteria, for example, are upper altitude limit exceeded, lower altitude limit exceeded, lost link, and soaring mode disabled by ground station operator.

The third component is the latch mechanism 820. The latch mechanism 820 receives inputs from the thermal detection logic 800 and the thermal rejection logic 810 and provides the actual "switch" command from soaring flight to searching flight and visa-versa to the aircraft.

What is described are specific examples of many possible variations on the same invention and are not intended in a limiting sense. The claimed invention can be practiced using other variations not specifically described above.

What is claimed is:

1. A method for locating and using thermals to improve endurance of an uninhabited air vehicle comprising:
   calculating energy rate and energy acceleration from total energy of the air vehicle using static pressure around the air vehicle, true air speed of the vehicle, and air vehicle engine input;
   calculating a thermal radius, velocity, and position using the energy rate and a location of the air vehicle;
   calculating air vehicle position error and velocity error using location of the air vehicle, the thermal radius, the thermal velocity, and the thermal position;
   calculating a soaring turn rate for the air vehicle using the position error, the velocity error, and a steady-state turn rate required to fly within the thermal when the air vehicle meets a selected climb rate;
   calculating a final turn rate for the air vehicle through mode switching using the energy acceleration, the soaring turn rate, and a waypoint tracking turn rate; and, controlling the air vehicle to guide the air vehicle to the thermal to stay within the thermal when the air vehicle meets a selected climb rate.

2. The method of claim 1, wherein the calculating energy rate and energy acceleration step further comprises:
   calculating an engine input effect on energy rate using the true air speed and air vehicle engine input;
   calculating a total energy using air vehicle velocity and static pressure around the air vehicle;
   filtering the total energy to remove noise and measurement resolution errors;
   differentiating the filtered total energy to obtain a rate of change of input;
   calculating energy rate by adding the engine input effect to the rate of change of input; and,
   calculating the energy acceleration by differentiating the energy rate.

3. The method of claim 1, wherein calculating the thermal radius further comprises:
   calculating the thermal velocity by building a history of previous aircraft locations using previous aircraft positions and energy rates to obtain a thermal velocity estimation;
   calculating thermal drift correction using the history of previous aircraft locations and energy rates;
   calculating thermal location by calculating a center of the thermal position using an aircraft location obtained after thermal drift correction; and,
   calculating thermal radius using the location of the air vehicle, the thermal velocity calculation, the thermal drift correction, the aircraft location after thermal drift correction, and the center of the thermal position.

4. The method of claim 1, wherein the mode switching comprises:
   using normalized energy acceleration and energy rate to make a determination of when the air vehicle reaches a crest of the thermal;
   using energy rate to make a lift determination of when lift caused by the thermal falls below a selected level; and,
   calculating a thermal stopping point wherein the air vehicle leaves the thermal using the crest determination and lift determination.

5. The method of claim 1, wherein the controller step comprises controlling an air vehicle turn rate and velocity to guide the air vehicle to an approximate center of the thermal.

6. The method of claim 5, wherein controlling air vehicle turn rate comprises the steps of:
   flattening the turn rate as an air vehicle climb rate increases;
   steepening the turn rate as the air vehicle climb rate decreases; and,
   maintaining a constant turn rate as the air vehicle climb rate is constant.

7. The method of claim 6, wherein the flattening and steepening steps use energy acceleration gain data.

8. The method of claim 5, wherein the controlling step comprises inputs of normalized energy acceleration, position error, velocity error, and steady-state turn rate.

9. The method of claim 8, wherein the inputs are limited to prevent a single input from dominating the result.

10. The method of claim 9, wherein the controlling step only allows the air vehicle to turn left.

* * * * *